United States Patent [19]
Hatwar

[11] Patent Number: 5,875,169
[45] Date of Patent: Feb. 23, 1999

[54] MAGNETO-OPTIC DATA STORAGE DEVICE HAVING MULTIPLE DATA STORAGE LEVELS

[75] Inventor: Tukaram K. Hatwar, Penfield, N.Y.

[73] Assignee: Eastman Kodak Company, Rochester, N.Y.

[21] Appl. No.: 873,664

[22] Filed: Jun. 12, 1997

[51] Int. Cl.$^6$ .................................................. G11B 3/70
[52] U.S. Cl. ........................................ 369/272; 369/283
[58] Field of Search ................................ 369/272, 275.2, 369/283, 286, 284, 13; 428/900

[56] References Cited

U.S. PATENT DOCUMENTS

| | | | |
|---|---|---|---|
| 4,450,553 | 5/1984 | Holster et al. | 369/275.1 |
| 5,202,875 | 4/1993 | Rosen et al. | 369/94 |
| 5,255,262 | 10/1993 | Best et al. | 369/275.1 |
| 5,305,300 | 4/1994 | Ohta et al. | 369/275.2 |
| 5,381,401 | 1/1995 | Best et al. | 369/275.1 |
| 5,449,566 | 9/1995 | Fujii et al. | 369/13 |
| 5,612,109 | 3/1997 | Tyan et al. | 428/64.1 |

FOREIGN PATENT DOCUMENTS

| | | |
|---|---|---|
| 03048730 | 3/1989 | European Pat. Off. . |
| 04-186545 | 7/1992 | Japan . |
| 05-6584 | 1/1993 | Japan . |
| 05-101465 | 4/1993 | Japan . |
| 08-45126 | 2/1996 | Japan . |
| 91/08578 | 6/1991 | WIPO . |

OTHER PUBLICATIONS

"Multilevel Volumetric Optical Storage", by Rubin et al SPIE vol. 2338 [1994] pp. 247–253.
"Effect of Sputter–Deposition Processes on the Microstructure and Magnetic Properties of Pt/Co Multilayers", by Carcia et al J. Mag. Magn. Mat. 121(1993) pp. 452–460.
"Co/Pt and Co/Pd Multilayers as Magneto–Optical Recording Materials", by Hashimoto et al J. Mag. Magn. Mat. 88(1990) pp. 211–226.
"Hysteresis, Microstructure, and Magneto–Optical Recording in Co/Pt and Co/Pd Multilayers", Zeper et al J. Appl. Phys. 70(1991) pp. 2264–2271.
"Co/Pt and Co/Pd Ultrathin Multilayered Films as New Magneto–Optical Recording Materials", by Ochiai et al IEEE Trans. MAG 25 (1989) pp. 3755–3757.

*Primary Examiner*—Allen T. Cao
*Attorney, Agent, or Firm*—Raymond L. Owens

[57] ABSTRACT

A magneto-optic data storage device includes multiple data storage levels, each storage level including a transparent dielectric seed layer and a partially transmissive recording layer having a multilayer structure including alternating layers of Co/Pt forming a superlattice structure disposed over the seed layer wherein the sputtering pressure for depositing the Co/Pt superlattice recording layer was below 40 mTorr; and wherein the seed layer is formed of ITO and has a thickness between 20 nm to 100 nm and was sputter deposited at a pressure of greater than 8 mTorr and less than or equal to 20 mTorr so that the superlattice recording layer has a high coercivity and high Kerr rotation and wherein the superlattice recording layer has a thickness of from between 2 to 20 nm.

9 Claims, 11 Drawing Sheets

MAGNETO-OPTIC DATA STORAGE DEVICE HAVING MULTIPLE DATA STORAGE LEVELS

CROSS REFERENCE TO RELATED APPLICATIONS

Reference is made to commonly assigned U.S. application Ser. No. 08/873,647 filed Jun. 12, 1997, entitled "Method for Forming a High Performance Magneto-Optic Multilayer Recording Device" by Tukaram K. Hatwar and U.S. application Ser. No. 08/616,148 filed Mar. 14, 1996 by Yuan-Sheng Tyan, G. Farruggia and Tukaram K. Hatwar entitled "Forming a High Performance Co/Pt Disk", the teachings of which are incorporated herein by reference.

FIELD OF THE INVENTION

This invention relates to a magneto-optic data storage device having multiple data recording levels for increased storage capacity.

BACKGROUND OF THE INVENTION

An optical disk with multiple data levels is used to increase the capacity of the disk (for example, see references: Rubin et al SPIE vol. 2338 [1994] 247; Holster et al, U.S. Pat. No. 4,450,553 [1984]; Rosen et al U.S. Pat. No. 5,202,875; Best et al, U.S. Pat. No. 5,255,262; Best et al, U.S. Pat. No. 5,381,401). Data are selectively accessed by the laser beam from the different recording levels by changing the focal position of the focusing lens. The storage media used for this purpose and described in U.S. Pat. No. 5,381,401, are typically non-metallic transmissive materials such as dyes and GeTe-based phase change materials. A multilevel magneto-optical storage disk was prepared using a Co/Pt recording layer as mentioned in the commonly assigned U.S. Pat. No. 5,612,109. Even though these Co/Pt superlattice recording layers can be made thinner to increase the transmission through the layer, the materials were deposited at abnormally high sputtering pressure to increase the coercivity of the layer. At such high sputtering pressure, the recording layers become very porous and their Kerr rotation and reflectivity decrease significantly.

SUMMARY OF THE INVENTION

It is an object of this invention to prepare a magneto-optic disk with multilevel structure using Co/Pt superlattice recording layers with a high coercivity, high Kerr rotation, high reflectivity and a good squareness of the Kerr hysteresis loop.

A further object of the present invention is to provide an improved media structure using Co/Pt multilayers but with increased performance such as low media noise, high carrier level and high carrier to noise ratio.

We found unexpectedly that a very thin Co/Pt superlattice recording layers (2–5 nm thick) can be prepared possessing a high coercivity, high Kerr rotation and high reflectivity by using a seed layer deposited at a sputtering pressure of greater than 8 mTorr Kr but less than 20 mTorr Kr. Such enhancement becomes even more pronounced when the thickness of the seed layer formed of indium tin oxide is greater than 20 nm.

The above objects are achieved in a magneto-optic data storage device comprising:

a) multiple data storage levels, each storage level including a transparent dielectric seed layer and a partially transmissive recording layer having a multilayer structure including alternating layers of Co/Pt forming a superlattice structure disposed over the seed layer wherein the sputtering pressure for depositing the Co/Pt superlattice recording layer was below 40 mTorr; and (b) wherein the seed layer is formed of ITO and has a thickness between 20 nm to 100 nm and was sputter deposited at a pressure of greater than 8 mTorr and less than or equal to 20 mTorr so that the superlattice recording layer has a high coercivity, high Kerr rotation and high reflectivity and wherein the superlattice recording layer has a thickness between 2 to 20 nm..

The following are advantages of magneto-optic media made in accordance with this invention.

By properly selecting the seed layer sputtering pressure and thickness, the resulting MO medium has a high coercivity, high Kerr rotation, high reflectivity and high squareness of the Kerr hysteresis loop, high perpendicular anisotropy, low recording noise and high carrier to noise ratio.

It permits preparation of a high performance multilevel disk by using very thin recording layer of Co/Pt superlattices (2–5 nm thickness), and having optical transmission of 45% and more while still possessing very high coercivity, high Kerr rotation, high reflectivity and squareness of the Kerr hysteresis loop.

DETAILED DESCRIPTION OF THE PREFERRED EMBODIMENTS

Figure 1:
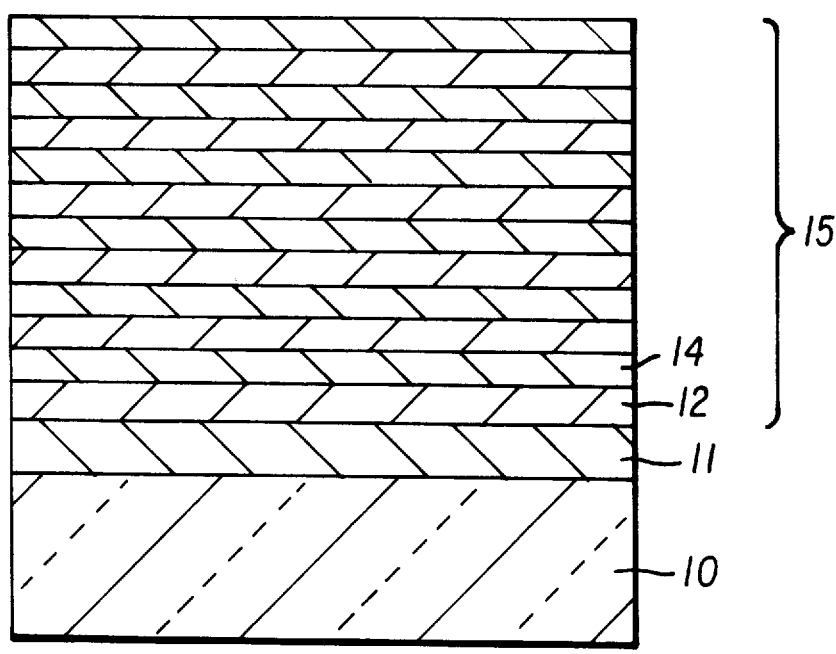
FIG. 1 is a schematic showing a multilayer magneto-optic disk structure made by depositing alternating layers of Co and Pt.

Turning first to FIG. 1, showing a magneto-optic data storage device having a substrate 10 which is made of polycarbonate and a seed layer 11 made of indium-tin oxide. A multilayer recording layer 15 disposed over the substrate has alternating layers 12 and 14 of Pt and Co. The substrate 10 is grooved and transparent. Light from a laser or other source will illuminate the recording multilayer structure as described through the substrate. On the substrate there is provided the multilayer recording layer 15 formed of alternating layers 12 and 14 of Pt and Co. Between the substrate 10 and the multilayered recording layer 15 is the seed layer 11, which will be discussed later. Preferably, a UV curable lacquer overcoat 18 is provided on top of the multilayer structure. An example of such a lacquer is "Dyecure Clear SD-17", a UV curable acrylic resin available from Dainippon Ink and Chemicals, Inc. The lacquer is typically applied by a spin coating technique and cured in the presence of UV light. This structure is particularly suitable for use in disk type storage devices such as magneto-optic disks, compact disks (CD) and photo compact disks (Photo CD).

With this type of structure, incident laser light illuminates a particular portion of the substrate 10, passes through the substrate 10, and interacts with the multilayered structure changing the Kerr rotation. As is well known, during readout, the Kerr rotation can be monitored to indicate whether a bit has been recorded.

The seed layer 11 made of amorphous indium-tin-oxide were prepared by d.c. sputtering a homogenous target having varying amounts of $(In_2O_3)_{1-x}(SnO_2)_x$, where x=0.25–0.75 prepared by hot press method. Kr gas was used for sputtering but other gases such as Ar, Xe or their mixture with or without oxygen content can be used. The sputtering pressure and deposition rate were 1–100 mTorr Kr and 0.2–1.2 mm/second, respectively.

Co/Pt recording layers 15 were prepared by d.c. sputtering Co and Pt targets. The base pressure before depositing the structure was about $1 \times 10^{-5}$–$1 \times 10^{-6}$ Toor and deposition pressure was about 15–40 mTorr. Alternate layers 12 and 14 of Pt and Co were deposited onto a substrate spinning at 20–250 revolutions per minute over the Co and Pt targets. The thickness of each layer 12 and 14 (Pt and Co) were adjusted by controlling the deposition rate and the substrate rotation speed. The thickness of Co and Pt were 0.2–0.8 nm and 0.4–1.8 nm respectively and the number of bilayers was 2–25. The deposition was done using Kr gas but other gases such as At, Xe or their mixtures can be used.

Several test samples were prepared by depositing the Co/Pt multilayers without and with seed layers 11 on glass and polycarbonate (PC) substrates. Structures were also deposited on the 5.25 inch dia. disks.

Figure 2:
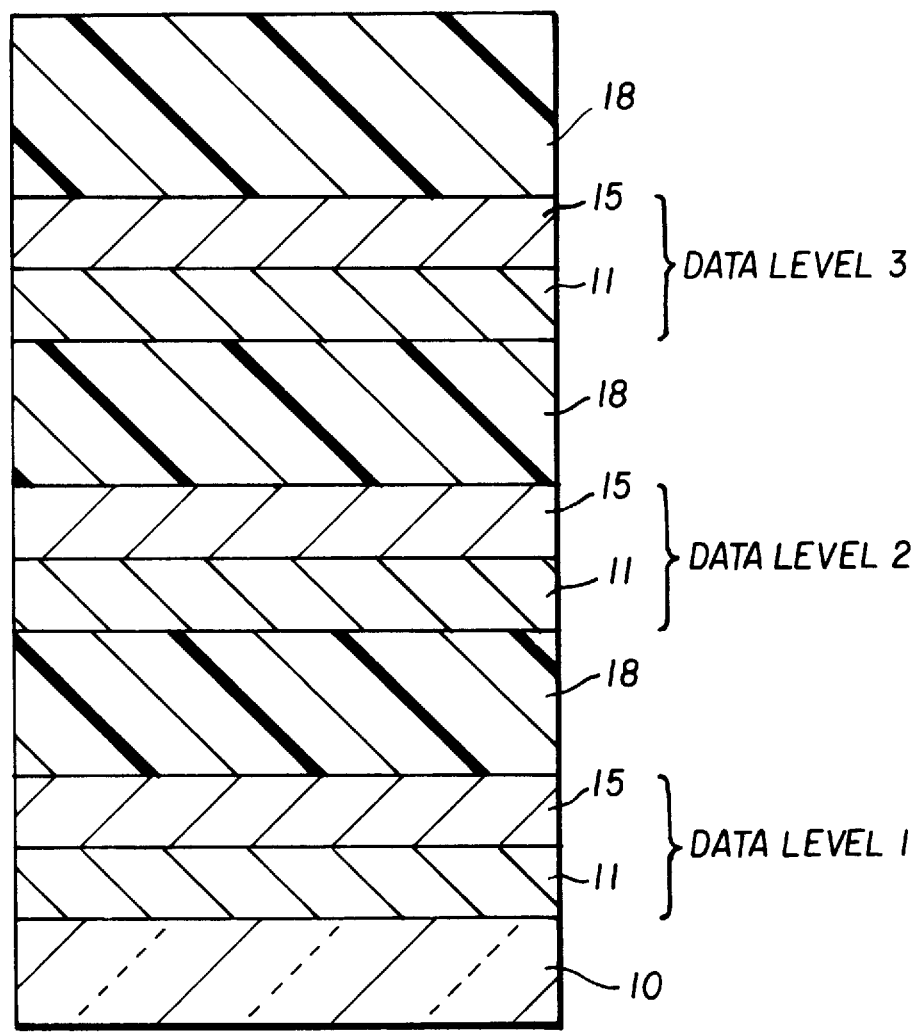
FIG. 2 shows a magneto-optical storage device having multiple data recording levels made in accordance with the invention.

The main requirements for the multilevel scheme is to have distinct recording data levels which are partially transmissive and separated by a non-absorbing spacer region. This spacer can be air or a non-absorbing thin layer of UV-cured lacquer. The thickness of the transparent space layer is from 2–100 $\mu$m thick and is overcoated on each recording level. Turning now to FIG. 2 where an optical data storage medium in accordance with the present invention is shown. The medium includes three recording data levels, but it will be understood that more than that number can also be used in accordance with the present invention. Each recording data level includes a seed layer 11, a Co/Pt multilayer 15, and a UV-cured lacquer layer 18. The top UV-cured lacquer layer 18 is, of course, also an overcoat. For a more complete description, the structure of these particular layers, reference should be made to the discussion in FIG. 1. The entire structure is mounted on a substrate 10.

For the first recording data level (which is closer to the write/read laser beam) the transmission should be maximum (at least >45%). This facilitates the laser radiation positioned on the one side of the disk structure to penetrate the first and subsequent layers and the recording or read out can be performed without the use of excessive laser power. For a high performance Co/Pt superlattice disk the desirable thickness is greater than 15 nm. Also sputter deposition is a method of choice for high throughput manufacturing the Co/Pt superlattice magneto-optic media and sputtering pressure is kept less than 40 mTorr. It was observed earlier that the squareness of the Kerr hysteresis loop and the anisotropy energy is very small when the Co/Pt multilayers are deposited at a sputtering pressure above 15 mTorr. (For example, see references, Carcia et al J. Mag. Magn. Mat. 121(1993) 452; Hashimoto et al J. Mag. Magn. Mat. 88(1990)211; Zeper et al J. Appl. Phys. 70 (1991)2264, Ochiai et al IEEE Trans. MAG 25 (1989)3755, and Ochiai et al, European Patent Appl. 0304873 (1988). These multilayers have poor crystalline quality and the optical noise is unacceptably high. Thus the useable sputtering pressure for depositing Co/Pt with satisfactory performance was limited to less than 15 mTorr (see reference, International Patent Appl. WO/91/08578 by Carcia, "Process for sputtering multilayers for magneto-optic recording", 1991). Also, Co/Pt media having greater than 15 mn thickness and deposited using conventional sputter deposition conditions such as use of low sputtering pressure is opaque to light transmission. The laser energy is totally absorbed in the recording layer and is not able to pass through the subsequent layers. Thus Co/Pt superlattice recording layers of these thickness prepared in a conventional manner cannot be used for multilevel recording scheme.

The transmission through the recording layer can be increased by decreasing the thickness of the recording layer. When the thickness of the Co/Pt superlattice recording layer is decreased, both coercivity and the Kerr rotation decrease rapidly.

Figure 3A:
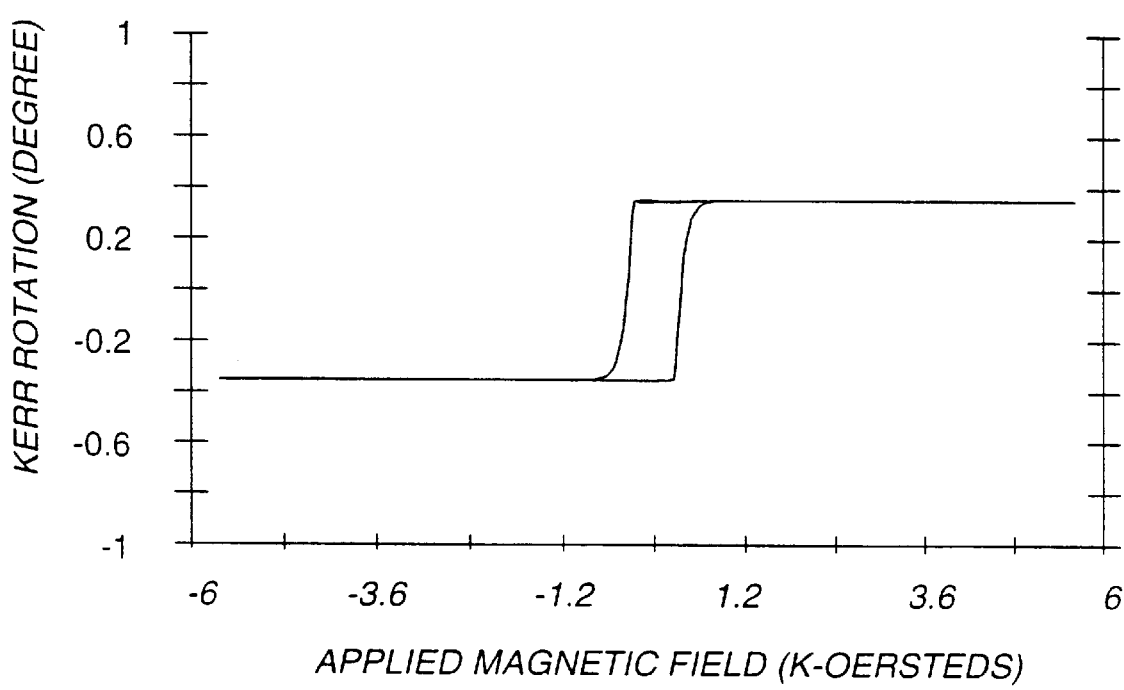
FIGS. 3A shows the Kerr hysteresis loop for 5 nm Co/Pt recording layer wherein the sputter deposition pressure for Co/Pt recording layer was 15 mTorr and the deposition pressure for 3.5 nm ITO seed layer was 3 mTorr.

As an example, FIG. 3A shows the Kerr hysteresis of the 5 nm thick Co 0.3 nm/Pt 0.7 nm structure deposited using 3.5 nm ITO on the glass substrate. The deposition pressure for Co/Pt and ITO were 15 mTorr and 3 mTorr respectively. It has significantly lower coercivity of 250 Oersted and a Kerr rotation equal to 0.40 degree. In comparison, a typical 15 nm Co/Pt recording layer will has a coercivity of 1200 Oe and the Kerr rotation of 0.57 degree. Thus the 5 nm Co/Pt medium with a such low coercivity cannot be used for recording purpose.

Figure 3B:
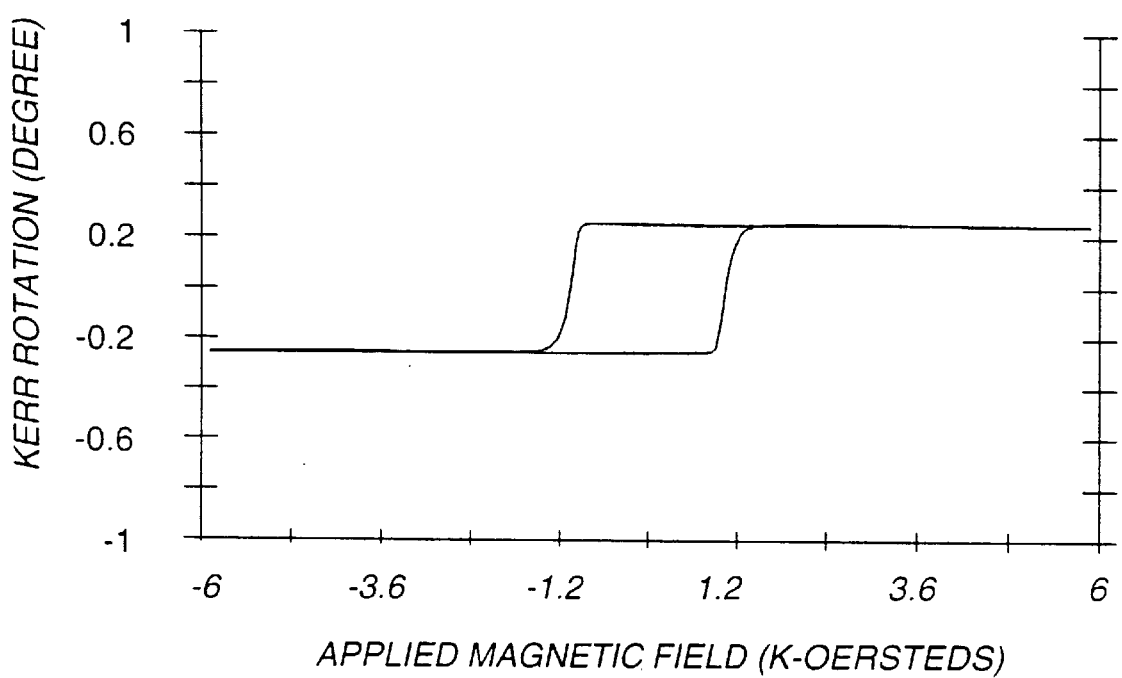
FIG. 3B shows the Kerr hysteresis loop for 5 nm Co/Pt recording layer wherein the sputter deposition pressure for Co/Pt recording layer was 75 mTorr and the deposition pressure for 3.5 nm ITO seed layer was 3 mTorr.

The recording layer coercivity can be increased by depositing the Co/Pt recording layer using a sputtering pressure in excess of 40 mTorr and seed layer sputtering less than 5 mTorr as described in commonly assigned U.S. Pat. application Ser. No. 08/616,148. FIG. 3B shows the Kerr hysteresis loop from a 5 nm thick recording layer deposited at 75 mTorr sputtering pressure. The coercivity of this recording layer has increased to 1200 Oe, but the Kerr rotation is significantly reduced to about 0.30 degree. This Kerr rotation is about 30% lower than that of FIG. 3A. The recording layer becomes very porous when deposited at this abnormally high sputtering pressure. Also, the reflectivity of this recording layer is lower. The figure of merit of this recording layer is also about 40% lower than obtained from the structure of FIG. 3A. The term "figure of merit" refers to the product of the Kerr rotation and the reflectivity ( R. $\Theta$k). The carrier level signal is directly proportional to the figure of merit of the recording layer. A large figure of merit is required to obtain a high carrier level and thus the high Carrier to Noise Ratio (CNR). This structure will have a significantly lower read back signal level.

We unexpectedly found that very thin recording layers of Co/Pt superlattice recording layer can be prepared with a high coercivity and still maintaining its high Kerr rotation when the Co/Pt recording layer was deposited at a pressure lower than 40 mTorr and the ITO seed layer thickness greater than 20 nm was deposited at a sputtering pressure more than 8 mTorr.

Figure 3C:
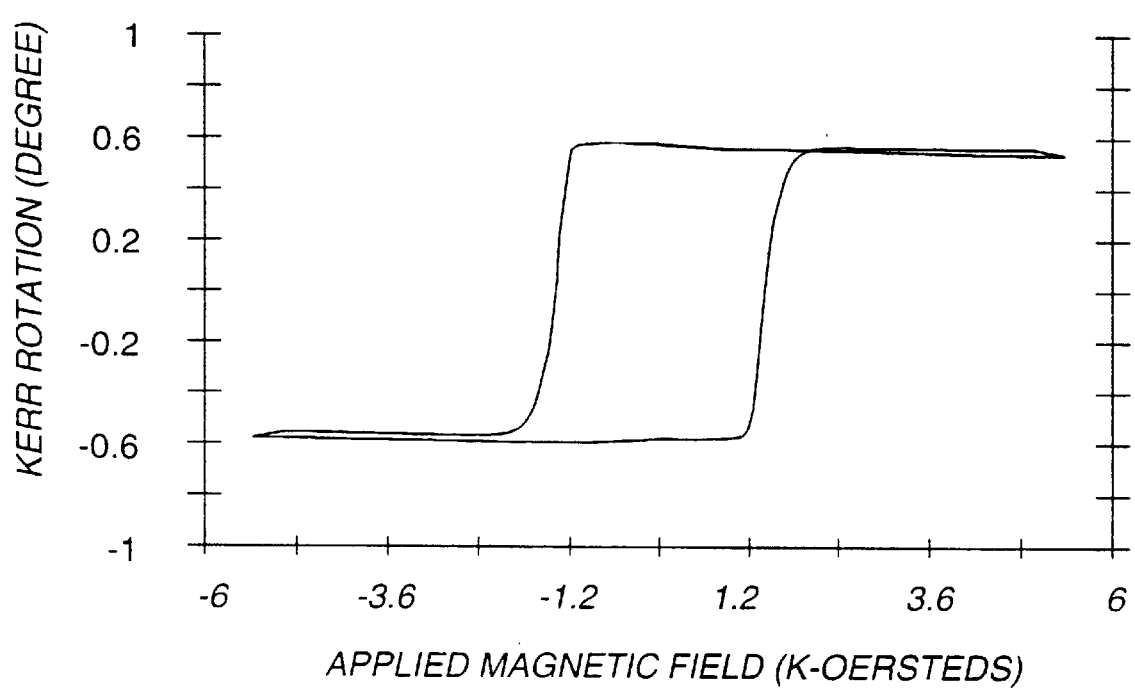
FIG. 3C shows plot of Kerr hysteresis loops of 5 nm thick Co/Pt recording layer deposited on a 60 nm thick ITO seed layer. The deposition pressure for the Co/Pt superlattice recording layer was 20 mTorr Kr and for ITO seed layer was 12 mTorr Kr.

FIG. 3C show Kerr hysteresis of the 5 nm Co/Pt recording layer deposited on 60 nm thick ITO seed layer, wherein the sputter deposition pressure of the ITO seed layer was 12 mTorr. The coercivity of this recording layer is significantly higher than obtained from FIG. 3A. Also the Kerr rotation from the recording layer is higher than that obtained from FIG. 3A and FIG. 3.B Thus both high coercivity and the high Kerr rotation were realized using a 60 nm thick ITO seed layer deposited at 12 mTorr Kr. The Kerr rotation is significantly higher due to the optical enhancement offered by the ITO seed layer. The thickness of this ITO seed layer can be tuned to obtain optimum Kerr rotation and the reflectivity of the disk. The Kerr rotation when measured from the front surface of this recording layer was also 30% higher than that measured from the front surface of the recording layer described in FIG. 3B. When taken together the reflectivity and the Kerr rotation, the figure of merit of this recording layer was also about 40% higher than obtained from the structure described for FIG. 3B.

Figure 4:
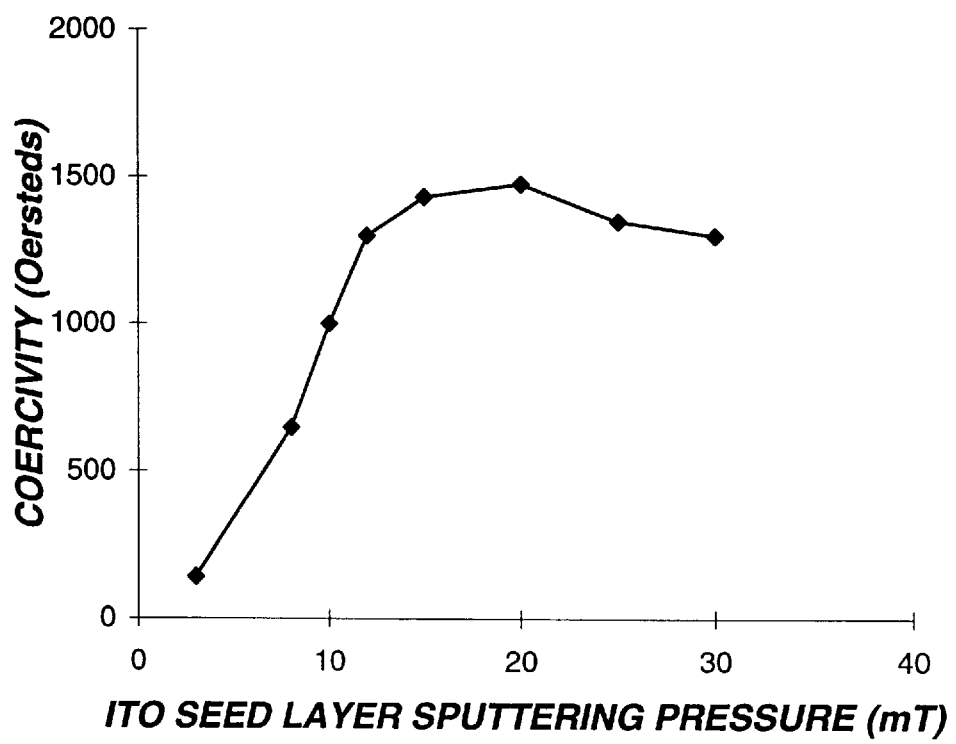
FIG. 4 shows a plot of coercivity of the 5 nm Co/Pt recording layer as a function of the ITO seed layer sputtering pressure.
Figure 5:
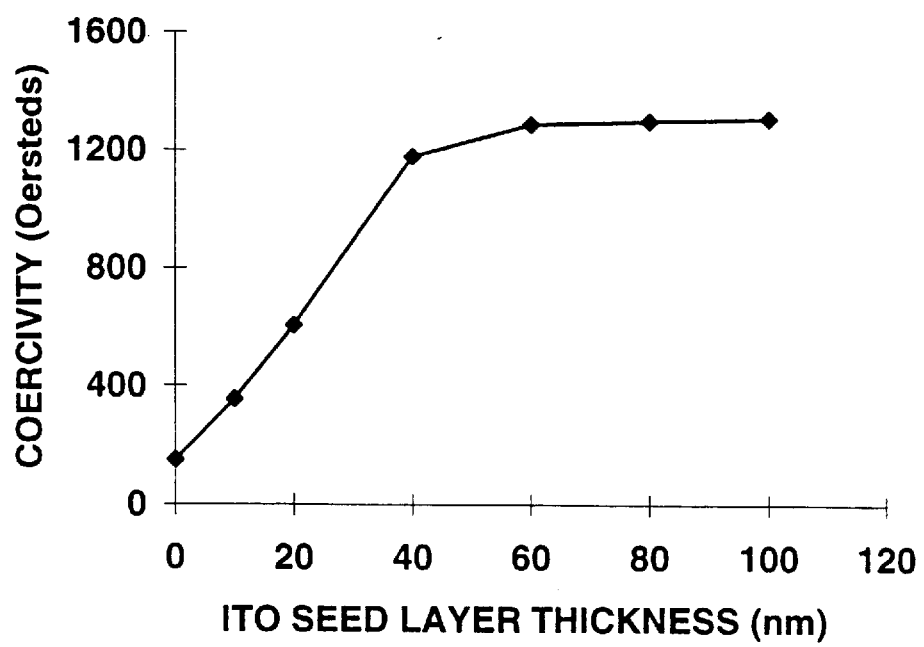
FIG. 5 shows a plot of coercivity of the 5 nm Co/Pt recording layer as a function of the ITO seed layer thickness.

The coercivity of the thin Co/Pt can further be optimized by adjusting the thickness and the sputtering pressure of the ITO seed layer. FIG. 4 and FIG. 5 show the dependence of the coercivity of a 5 nm Co/Pt recording layer as a function of the sputtering pressure and the thickness of the ITO seed layer. Thus, improvement in the Kerr loop squareness, coercivity and Kerr rotation is obtained by depositing ITO seed layer greater than 20 nm thick at sputtering pressure higher than 8 mTorr Kr.

Figure 6A:
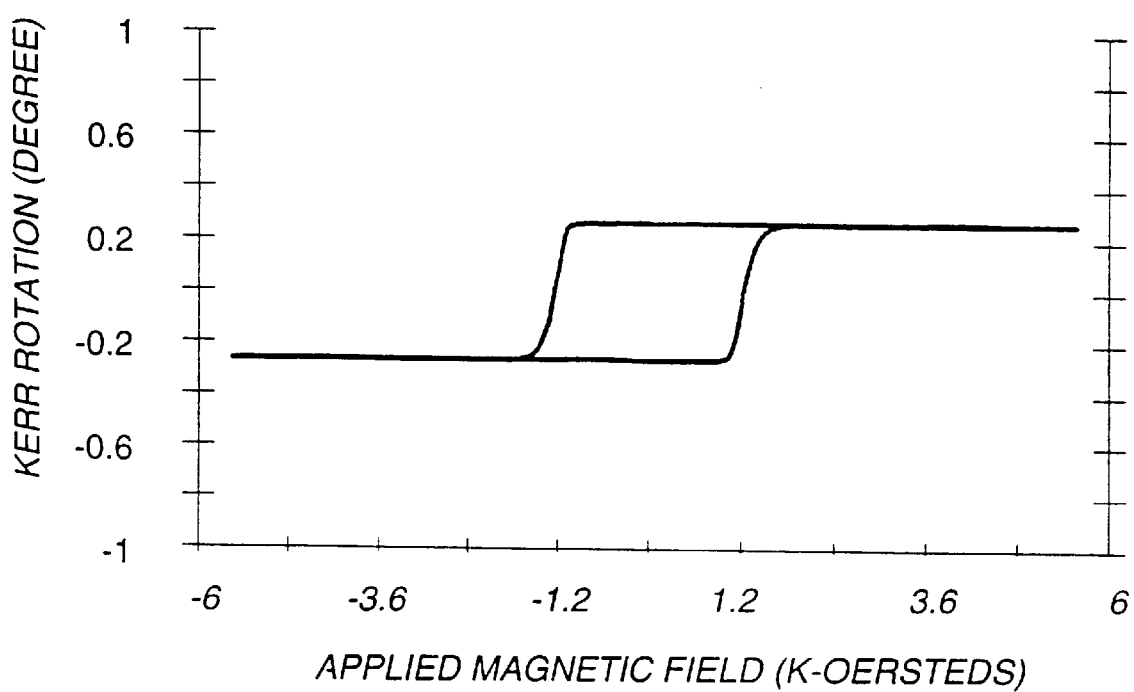
FIG. 6A, 6B and 6C show Kerr hysteresis loops of 2.0 nm, 3.0 nm and 4.0 nm thick Co 0.30 nm /Pt 0.7 nm multilayer respectively. The thickness of ITO seed layer was 60 nm. The deposition pressure for the Co/Pt superlattice recording layer was 20 mTorr Kr and for ITO seed layer was 12 mTorr Kr.
Figure 6B:
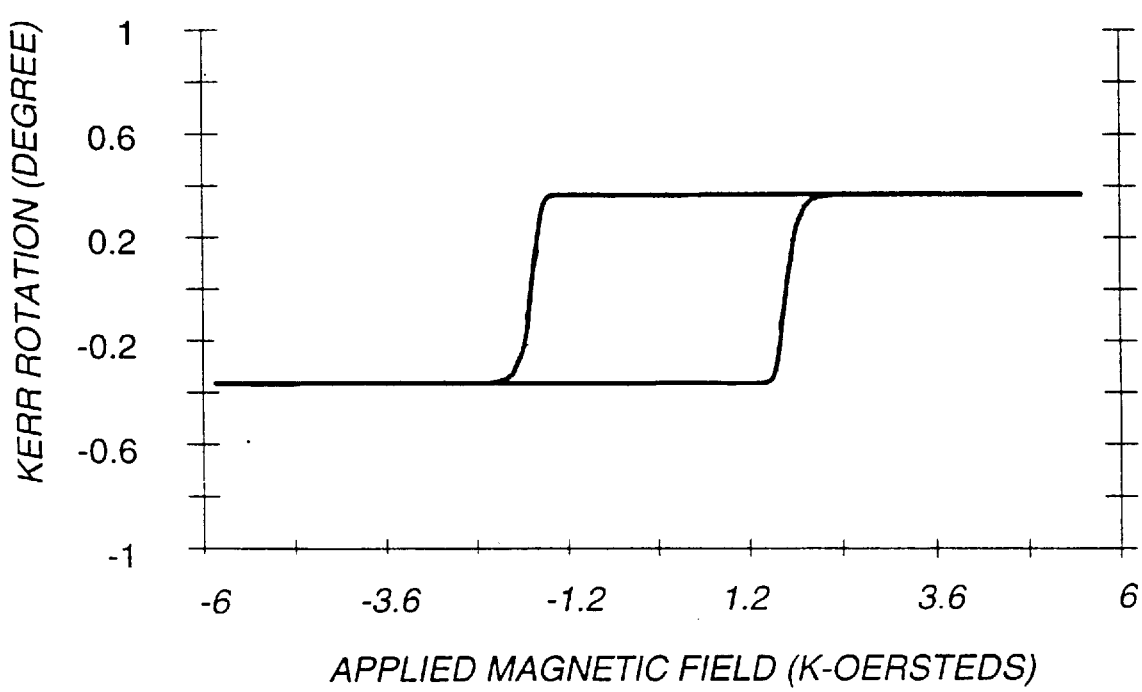
Figure 6C:
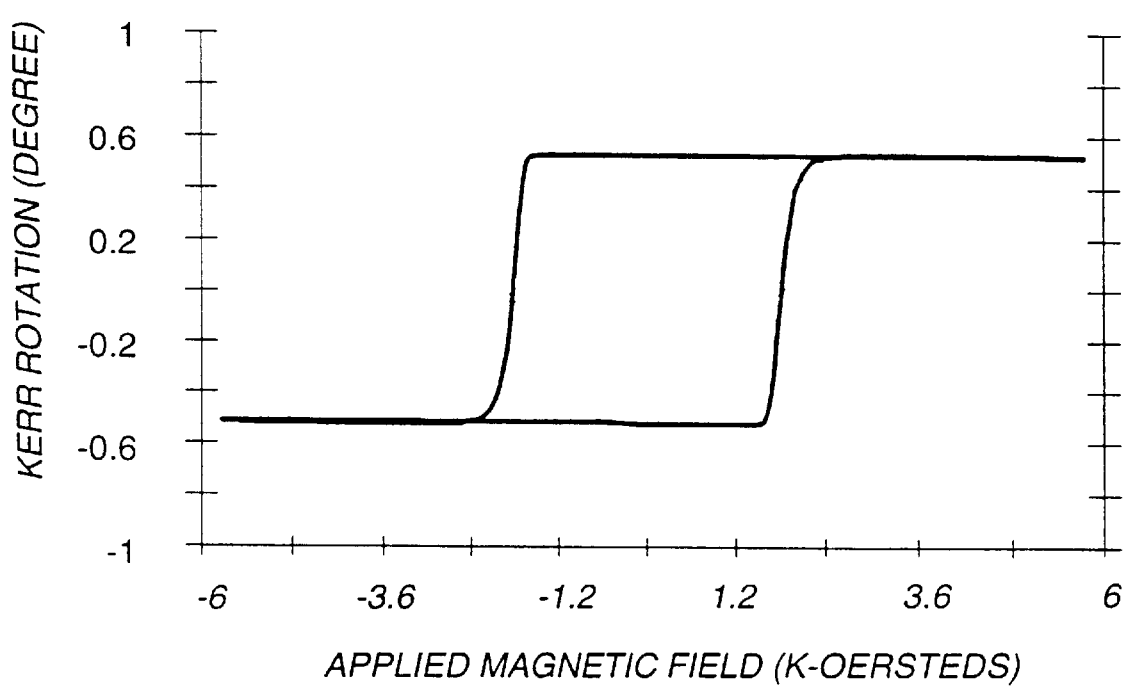

The transmission through the recording layer can be increased by decreasing the thickness of the Co/Pt recording layer. FIG. 6A, 6B and 6C show a series of Kerr hysteresis loop obtained from 2.0 nm, 3.0 nm and 4.0 nm thick Co 0.3 nm /Pt 0.7 nm recording layers respectively. The thickness of ITO seed layer was 60 nm. The deposition pressure for the Co/Pt superlattice recording layer was 20 mTorr Kr and for ITO seed layer was 12 mTorr Kr.

Figure 7:
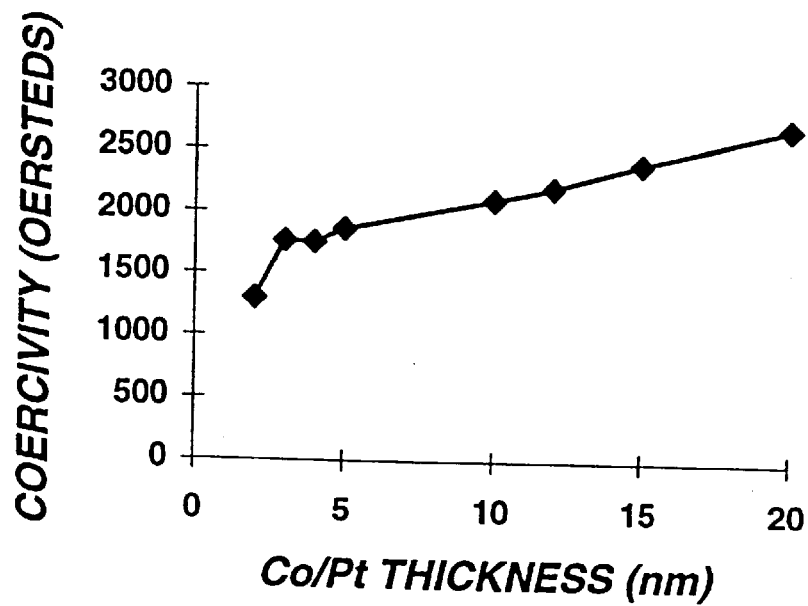
FIG. 7 show a plot of coercivity of the Co/Pt recording layer as a function of thickness of the recording layer.

FIG. 7 shows the dependence of the coercivity of the Co/Pt recording layer as a function of the recording layer thickness. It shows that coercivity greater than 1200 Oe was obtained for a Co/Pt recording layer as thin as 2 nm. These ultra-thin layers of thickness 2–5 nm can be used effectively as a recording layer for Data-level 1 or Data level 2 in the preparation of a multilevel disk.

Figure 8:
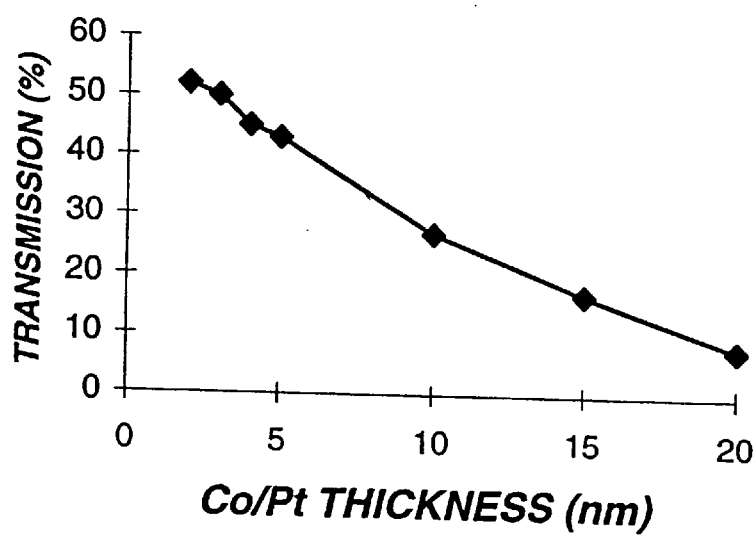
FIG. 8 shows a plot of transmittance through the Co/Pt recording layer as a function of Co/Pt recording layer thickness.

FIG. 8 shows the transmission through the Co/Pt recording layer as a function of the thickness. A very high transmission greater than 45% was obtained for a ultra-thin recording layer of Co/Pt multilayer. These ultra-thin recording layers (2–5 nm thick) possess high coercivity, high Kerr rotation, high reflectivity and high transmission which makes them suitable for using to prepare a multi-level disk structure.

These ultra thin layers of Co/Pt having thickness of 2 nm to 4 nm and having high coercivity, high Kerr rotation and the high transmission can be used as a partially absorbing recording layer for the first data level. When using multiple data levels the recording level closer to the laser beam will be thinnest. The recording layer thickness will increase when it is farther from the laser beam. The last recording level is thickest to get maximum reflection from this layer.

An Additional reflector layer of Al, Ag, Cu, Au or their alloys can be deposited on the top of the last recording level to enhance the reflectivity of the disk.

A two-level disk structure as shown in FIG. 2 was prepared as follows: First a data level 1 recording layer was deposited by sputter depositing 5 nm thick alternating layers of Co 0.3 nm/Pt 0.7 nm at a sputtering pressure of 75 mTorr Kr on to a 3.5 nm thick In—Sn—O seed layer deposited at 3 mTorr Kr on the 5.25" dia. glass substrate. A 20 $\mu$m lacquer layer which acts as a spacer was overcoated by spin coating on the Co/Pt multilayer. Then data level 2 recording layer consisting of 3.5 nm In—Sn—O seed layer deposited at 3 mTorr Kr followed by 20 nm Co 0.25/Pt 0.7 nm multilayer deposited at 20 mTorr Kr was deposited on the lacquer layer. Finally a second layer of 20 um lacquer was spin coated as a protective overcoat. Magneto-optical properties of both the recording layers were measured. The figure of merits (R. Θk) of the level 1 and level 2 recording layers were 0.04 and 0.18 respectively. In an another experiment, recording level 1 of the above two-level disk was prepared by sputter depositing 5 nm thick alternating layers of Co 0.3 nm/ Pt 0.7 nm at a sputtering pressure of 20 mTorr Kr on to a 60 nm thick In—Sn—O seed layer deposited at 12 mTorr Kr on the 5.25" dia. glass substrate. This recording layer has a significantly higher figure merit of 0.10. The data level 2 recording layer was prepared by depositing 20 nm Co 0.25/Pt 0.7 nm multilayer on 60 nm thick In—Sn—O seed layer. The sputtering pressures for the Co/Pt layer and the ITO layer were 20 mTorr and 10 mTorr respectively. This recording level has a high figure of merit of 0.18. Thus a significantly improved performance was obtained by following the present invention. The performance of the multilevel recording disk can be further improved by adjusting the cobalt to platinum ratio of the recording layers, and by optimizing the disk structure, deposition conditions and the test procedure.

The invention has been described in detail with particular reference to certain preferred embodiments thereof, but it will be understood that variations and modifications can be effected within the spirit and scope of the invention.

What is claimed is:

1. A magneto-optic data storage device comprising:
   a) multiple data storage levels having at least first and second data storage levels with the second data storage level being disposed over the first data storage level, each data storage level including a transparent dielectric seed layer and a partially transmissive recording layer having a multilayer structure including alternating layers of Co/Pt forming a superlattice structure disposed over said seed layer wherein the sputtering pressure for depositing the Co/Pt superlattice recording layer was below 40 mTorr and wherein the recording layer of the first multiple data storage level has a thickness less than the thickness of the recording layer of the second multiple data storage level;
   (b) wherein the seed layer is formed of ITO and has a thickness between 20 nm to 100 nm and was sputter deposited at a pressure of greater than 8 mTorr and less than or equal to 20 mTorr so that the superlattice recording layer has a high coercivity and high Kerr rotation and wherein the superlattice recording layer of the first recording layer has a thickness between 2 to 5 nm; and
   (c) a transparent spacer layer formed between the first and second data storage levels and being overcoated on each partially transmissive recording layer of the first multiple data storage level and having a thickness between 2–100 $\mu$m.

2. A magneto-optic data storage device of claim 1 wherein the Co/Pt multilayers were prepared by sputtering and the sputtering pressure for making the Co/Pt superlattice recording layer is above 15 mTorr.

3. A magneto-optic data storage device of claim 1 wherein sputtering is done in an inert sputtering gas selected from the group consisting of Ar, Kr or Xe and their mixtures in sputtering the Co and Pt superlattice recording layers.

4. A magneto-optic data storage device of claim 1 wherein the ITO seed layer is sputtering is done in a sputtering gas selected from the group consisting of Ar, Kr or Xe and their mixtures with or without oxygen to sputter the seed layer.

5. A magneto-optic data storage device of claim 1 wherein the seed layers includes material is selected from the group of $(In_2O_3)_{1-x}(SnO_2)_x$, where x=0.25–0.75.

6. A magneto-optic data storage device of claim 1 wherein each superlattice recording layer is sandwiched between two transparent dielectric surfaces to improve the Kerr rotation and the reflectivity.

7. A magneto-optic data storage device of claim 1 wherein said superlattice recording layer contains 2–20 bilayers of Co and Pt, the thickness of each of Co and Pt layers being uniform and between 0.2 to 0.8 nm and 0.4 to 1.8 nm, respectively.

8. A magneto-optic data storage device of claim 1 wherein a lacquer overcoat is deposited by spin coating on the last recording level.

9. A magneto-optic data storage device of claim 1 wherein a reflecting layer of Ag, Al, Cu, Au and/or their alloys is deposited on the last recording level.

* * * * *